(12) United States Patent
Ishiguro

(10) Patent No.: US 9,477,090 B2
(45) Date of Patent: Oct. 25, 2016

(54) LAMINATED BODY, POLARIZATION PLATE HAVING THEREOF, STEREOSCOPIC IMAGE DISPLAY DEVICE, AND STEREOSCOPIC IMAGE DISPLAY SYSTEM

(71) Applicant: FUJIFILM Corporation, Tokyo (JP)

(72) Inventor: Makoto Ishiguro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/301,659

(22) Filed: Jun. 11, 2014

(65) Prior Publication Data

US 2014/0293419 A1 Oct. 2, 2014

Related U.S. Application Data

(63) Continuation of application No. PCT/JP2013/050782, filed on Jan. 17, 2013.

(30) Foreign Application Priority Data

Jan. 31, 2012 (JP) .................................. 2012-017961

(51) Int. Cl.
| | |
|---|---|
| *G02B 27/26* | (2006.01) |
| *C09J 163/00* | (2006.01) |
| *G02F 1/13363* | (2006.01) |
| *G02B 5/30* | (2006.01) |
| *B32B 17/06* | (2006.01) |
| *G02F 1/1335* | (2006.01) |

(52) U.S. Cl.
CPC ............. *G02B 27/26* (2013.01); *B32B 17/064* (2013.01); *C09J 163/00* (2013.01); *G02B 5/3083* (2013.01);

(Continued)

(58) Field of Classification Search
CPC ....... G02B 27/26; G02B 5/3083; G02B 5/32; G02B 5/30; B32B 17/10; C09J 163/00; C09J 133/00
USPC ....... 359/428, 465, 468, 472, 483.01, 489.11
See application file for complete search history.

(56) References Cited

U.S. PATENT DOCUMENTS

| | | | |
|---|---|---|---|
| 2009/0068381 A1* | 3/2009 | Yi et al. ...................... | 428/1.31 |
| 2010/0143708 A1* | 6/2010 | Liao et al. .................... | 428/336 |
| 2011/0013121 A1* | 1/2011 | Kashima ...................... | 349/86 |

FOREIGN PATENT DOCUMENTS

| | | |
|---|---|---|
| JP | 2007-098690 A | 4/2007 |
| JP | 2008-209595 A | 9/2008 |

(Continued)

OTHER PUBLICATIONS

International Search Report issued in PCT/JP2013/050782 on Apr. 23, 2013.

(Continued)

*Primary Examiner* — Darryl J Collins
*Assistant Examiner* — Journey Sumlar
(74) *Attorney, Agent, or Firm* — Jean C. Edwards, Esq.; Edwards Neils LLC

(57) ABSTRACT

Provided are a laminated body which is made to extend and contract to a reduced extent due to humidity so as to reduce the number of the occurrence of crosstalk, a polarization plate having the same, a stereoscopic image display device and a stereoscopic image display system. A laminated body includes a patterned phase difference film having a supporter film and a patterned optical anisotropic layer in which a first phase difference region and a second phase difference region having mutually different in-plane slow axis directions and/or phase differences are disposed in a predetermined pattern on the supporter film, and a stiff body attached to a surface of the patterned optical anisotropic layer through a first attaching layer.

17 Claims, 5 Drawing Sheets

(52) U.S. Cl.
CPC ....... *G02F 1/13363* (2013.01); *B32B 2307/42* (2013.01); *B32B 2551/00* (2013.01); *G02F 1/133528* (2013.01); *G02F 2001/133631* (2013.01); *G02F 2001/133635* (2013.01)

(56) References Cited

FOREIGN PATENT DOCUMENTS

| JP | 2011-022419 A | | 2/2011 |
|----|---------------|---|--------|
| JP | 2011022419 A | * | 2/2011 |
| JP | 2012-013922 A | | 1/2012 |
| JP | 2012008170 A | * | 1/2012 |
| JP | 2012013922 A | * | 1/2012 |
| JP | 2012018396 A | * | 1/2012 |

OTHER PUBLICATIONS

Written Opinion issued in PCT/JP2013/050782 on Apr. 23, 2013.
Notice of Reasons for Rejection issued by the Japanese Patent Office on May 12, 2015 in connection with Japanese Patent Application No. 2013-556302.

* cited by examiner

LAMINATED BODY, POLARIZATION PLATE HAVING THEREOF, STEREOSCOPIC IMAGE DISPLAY DEVICE, AND STEREOSCOPIC IMAGE DISPLAY SYSTEM

CROSS-REFERENCE TO RELATED APPLICATIONS

This application is a Continuation of PCT International Application No. PCT/JP2013/050782 filed on Jan. 17, 2013, which was published under PCT Article 32(2) in Japanese, and which in turn claims priority under 35 U.S.C §119(a) to Japanese Patent Application No. 2012-017961 filed Jan. 31, 2012, the contents of all of which are hereby expressly incorporated by reference into the present application.

BACKGROUND OF THE INVENTION

1. Field of the Invention

The present invention relates to a laminated body which includes an optical anisotropic layer with a high-definition orientation pattern and is extended and contracted to a reduced extent due to humidity, a polarization plate having thereof, a stereoscopic image display device, and a stereoscopic image display system.

2. Description of the Related Art

In a stereoscopic (3D) image display device displaying a stereoscopic image, an optical member is required to turn an image for the right eye and an image for the left eye into, for example, circularly-polarized images in mutually opposite directions. For example, a patterned optical anisotropic layer in which regions having mutually different slow axes, retardation and the like are regularly disposed in a plane is used as the aforementioned optical member, and there has been more frequent use of a patterned phase difference film including a supporter made of a film as a supporter for the patterned optical anisotropic layer from the viewpoint of continuous productivity, handling properties, a decrease in thickness, a decrease in weight, economic aspect and the like.

In a stereoscopic image display device in which the patterned phase difference film is used, it is necessary to, for example, match pixels for an image for the right eye and an image for the left eye present in a display panel section such as a liquid crystal panel to phase difference regions for an image for the right eye and an image for the left eye in the patterned optical anisotropic layer respectively and attach them together.

As a material suitable for the patterned phase difference film, cellulose acylate is preferably used; however, when a filmed cellulose acylate film is aged at a high temperature and a high humidity, there is a case in which the dimensions change due to the absorption of moisture. Therefore, even when pixels for an image for the right eye and an image for the left eye present in the display panel section such as a liquid crystal panel and the phase difference regions for an image for the right eye and an image for the left eye in the patterned optical anisotropic layer are respectively matched and attached together, the dimensional change of the cellulose acylate film causes the positional deviation between the pattern in the patterned optical anisotropic layer and the pixels in the display panel. Then, there is a problem in that the crosstalk occurs more often and the display quality degrades. In addition, there is another problem in that the positional deviation between the pattern in the patterned optical anisotropic layer and the pixels in the display panel is caused, and therefore the yield deteriorates.

To suppress the above-described problems, there have been studies regarding the prescription of raw materials (for example, JP2008-209595A describes a method of using a specific cellulose nanofiber with a fibrous shape) or manufacturing conditions (for example, JP2007-098690A describes a method of changing the time and temperature of a relaxation process after the stretching of a film to obtain desired optical characteristics and a desired dimensional change ratio).

SUMMARY OF THE INVENTION

However, with the prescription of JP2008-209595A, there was a problem in that the cost increased. In addition, with the method of JP2007-098690A, there was a problem in that only a fixed range of aspects could be stretched and relaxed using a facility and in a case in which a variety of products were manufactured, it was necessary to change or alter the facility or have a plurality of facilities, and thus the productivity such as an operation rate became low.

The invention has been made in consideration of the above-described problems, and an object of the invention is to provide a laminated body in which the number of the occurrence of crosstalk is decreased by reducing the dimensional change (extension and contraction) of the laminated body due to humidity, a polarization plate having the same, a stereoscopic image display device and a stereoscopic image display system. Means for achieving the above-described object are as described below.

[1] A laminated body including a patterned phase difference film having a supporter film and a patterned optical anisotropic layer in which a first phase difference region and a second phase difference region having mutually different in-plane slow axis directions and/or phase differences are disposed in a predetermined pattern on the supporter film; and a stiff body attached to a surface of the patterned optical anisotropic layer through a first attaching layer.

[2] The laminated body according to [1], in which a thickness of the stiff body is in a range of 20 μm to 250 μm.

[3] The laminated body according to [1] or [2], in which the stiff body is glass.

[4] The laminated body according to any one of [1] to [3], in which an average dimensional change rate per 1% RH of humidity at a temperature of 25° C. and a relative humidity in a range of 10% RH to 90% RH is 0.0015% or less in a pattern cycle direction of the patterned optical anisotropic layer.

[5] The laminated body according to any one of [1] to [4], in which a supporter film is provided on at least one surface of the stiff body.

[6] A polarization plate, in which at least the laminated body according to any one of [1] to [5] and a polarizer are provided, and the laminated body and the polarizer are attached together through a second attaching layer.

[7] The polarization plate according to [6], in which the polarizer and the stiff body are attached together through the second attaching layer.

[8] The polarization plate according to [6], in which a protective film is further provided, and the protective film and the stiff body are attached together through the second attaching layer.

[9] The polarization plate according to any one of [6] to [8], in which an adhering force of the second attaching layer is smaller than an adhering force of the first attaching layer.

[10] The polarization plate according to any one of [6] to [9], in which the first attaching layer and the second attaching layer are either acrylic adhesives or epoxy-based adhesives.

[11] A stereoscopic image display device including at least a display panel driven based on an image signal; and the laminated body according to any one of [1] to [5] disposed on an image-displaying side of the display panel.

[12] A stereoscopic image display system including at least the stereoscopic image display device according to [11]; and a polarization plate disposed on an image-displaying side of the stereoscopic image display device, in which a stereoscopic image is displayed through the polarization plate.

According to the invention, it is possible to provide a laminated body in which the number of the occurrence of crosstalk is decreased by reducing the extension and contraction of the laminated body due to humidity, a polarization plate having the same, a stereoscopic image display device and a stereoscopic image display system.

DESCRIPTION OF THE PREFERRED EMBODIMENTS

Figure 1:
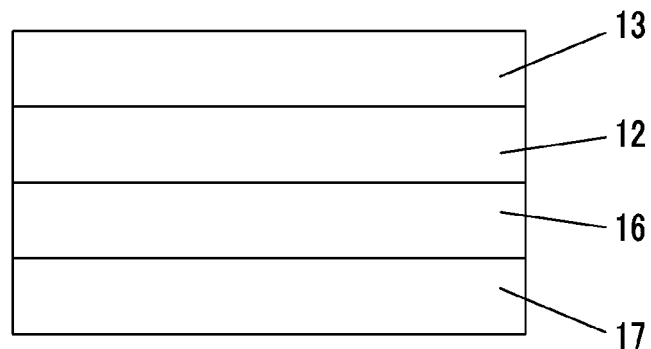
FIG. 1 is a schematic cross-sectional view of an example of a laminated body of the invention.

Hereinafter, the invention will be described in detail. Meanwhile, in the present specification, numeric ranges expressed using "to" indicate that the range includes numeric values described before and after "to" as the lower limit value and the upper limit value. First, terminologies used in the specification will be described.

Re ($\lambda$) and Rth ($\lambda$) represent in-plane retardation and retardation in the thickness direction at a wavelength of $\lambda$ respectively. Re ($\lambda$) is measured by entering light having a wavelength of $\lambda$ nm in a film normal direction in a KOBRA 21ADH or WR (manufactured by Oji Scientific Instruments). When a measurement wavelength $\lambda$ nm is selected, Re ($\lambda$) can be measured by manually exchanging wavelength-selecting filters or by converting a measured value using a program or the like. In a case in which a film under measurement is a film expressed as a uniaxial or biaxial index ellipsoid, Rth ($\lambda$) can be computed using the following method. Meanwhile, a part of the measurement method is also used to measure the average tilt angle of discotic liquid crystal molecules in an orientation film side section in an optical anisotropic layer described below and the average tilt angle in the opposite side section.

Rth ($\lambda$) can be computed as described below: the in-plane slow axis (determined by a KOBRA 21ADH or WR) is used as an inclined axis (rotation axis) (in a case in which there is no slow axis, an arbitrary direction in a film plane is used as the rotation axis), the Re ($\lambda$) is measured at a total of six points by entering light having a wavelength of $\lambda$ nm in a film normal direction and five other directions inclined from the normal direction toward a single side at ten-degree angular intervals up to 50 degrees, and a KOBRA 21ADH or WR computes Rth ($\lambda$) based on the measured retardation values, the assumed value of the average refractive index, and the input film thickness value. During the above-described computation, in a case in which a film has a direction in which the retardation value becomes zero at a certain inclined angle when the in-plane slow axis in the normal direction is used as the rotation axis, Rth ($\lambda$) is computed by a KOBRA 21ADH or WR after retardation values at inclined angles larger than the above-described inclined angle are changed to negative values. Meanwhile, it is also possible to use the slow axis as the inclined axis (rotation axis) (in a case in which there is no slow axis, an arbitrary direction in a film plane is used as the rotation axis), measure retardation values in two arbitrary inclined directions, and compute Rth using the following formulae (A) and (B) based on the measured retardation values, the assumed value of the average refractive index, and the input film thickness value.

[Formula 1]

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Formula (A)

Here, the Re ($\theta$) represents a retardation value in a direction inclined from the normal direction by an angle of $\theta$. In addition, nx in Formula (A) represents the refractive index in an in-plane slow axis direction, ny represents the refractive index in a direction orthogonal to nx in a plane, and nz represents the refractive index in a direction orthogonal to nx and ny. d represents the film thickness.

$$Rth = ((nx+ny)/2 - nz) \times d$$

Formula (B)

In a case in which the film under measurement is an article that cannot be expressed as a uniaxial or biaxial index ellipsoid, that is, a film having no optic axis, Rth ($\lambda$) is computed using the following method: the in-plane slow axis (determined by a KOBRA 21ADH or WR) is used as an inclined axis (rotation axis), the Re ($\lambda$) is measured at eleven points by entering light having a wavelength of $\lambda$ nm in directions inclined from –50 degrees to +50 degrees with respect to the film normal direction at ten-degree angular intervals, and a KOBRA 21ADH or WR computes Rth ($\lambda$) based on the measured retardation values, the assumed value of the average refractive index, and the input film thickness value. During the above-described measurement, values from a polymer handbook (JOHN WILEY & SONS, INC.) and a variety of optical film catalogues can be used as the assumed value of the average refractive index. Regarding an average refractive index that has not been known, it is possible to measure the average refractive index using an Abbe refractometer. The average refractive indexes of principal optical films are as described below: cellulose acylate (1.48), cycloolefin polymer (1.52), polycarbonate (1.59), polymethylmethacrylate (1.49) and polystyrene (1.59). The KOBRA 21ADH or WR computes nx, ny and nz when the assumed value of the average refractive index and the film thickness are input. Nz=(nx−nz)/(nx−ny) is further computed using the above-computed nx, ny and nz.

Meanwhile, in the specification, "visible light" have a wavelength in a range of 380 nm to 780 nm. In addition, in the specification, in a case in which there is no particular description regarding the measurement wavelength, the wavelength is 550 nm.

In addition, in the specification, angles (for example, an angle of "90°" or like) and angular relationships (for example, "orthogonal", "parallel", "intersect at 45°" and the like) are considered to include an error range permitted in the technical field to which the invention belongs. For example, an angle is considered to be in a range of the strict angle±less than 10°, and the error from the strict angle is preferably 5° or less, and more preferably 3° or less.

A laminated body of the invention includes a patterned phase difference film having a supporter film and a patterned optical anisotropic layer in which a first phase difference region and a second phase difference region having mutually different in-plane slow axis directions and/or phase differences are disposed in a predetermined pattern on the supporter film, and a stiff body attached to a surface of the patterned optical anisotropic layer through a first attaching layer.

In the invention, the stiff body having dimensions that change only slightly due to humidity is attached to the patterned optical anisotropic layer through the attaching layer containing an adhesive, a gluing agent or the like, and therefore the patterned phase difference film extends and contracts to a reduced extent due to the change in humidity. Then, the positional deviation between pixels for an image for the right eye and an image for the left eye in a display panel section such as a liquid crystal panel and phase difference regions for an image for the right eye and an image for the left eye in the patterned optical anisotropic layer is reduced, and furthermore, the number of the occurrence of crosstalk is also reduced. In the past, the stiff body was not added to the patterned phase difference film since the additional addition of the stiff body increased the cost. However, when the stiff body is added, the positional deviation from the phase difference regions for an image for the right eye and an image for the left eye in the patterned optical anisotropic layer is reduced, and therefore the yield improves, and a special supporter is not required either. Therefore, it is possible to reduce the cost as a whole.

Specifically, in the laminated body of the invention, the average dimensional change rate per 1% RH of relative humidity at a temperature of 25° C. and a relative humidity in a range of 10% RH to 90% RH is preferably 0.0015% or less, more preferably 0.0010% or less and particularly preferably 0.0005% or less in the pattern cycle direction of the patterned optical anisotropic layer.

Hereinafter, an embodiment of the invention will be described with reference to the drawings, and the correlations between the thicknesses of individual layers in the drawings do not reflect the actual correlations. In addition, in the drawings, similar members are given similar reference signs, and in some cases, will not be described in detail.

Figure 2:
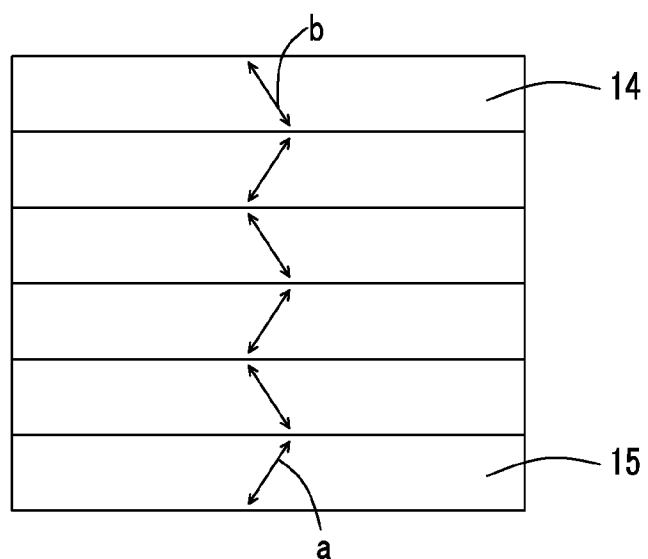
FIG. 2 is a schematic top surface view of an example of a patterned optical anisotropic layer.

A schematic cross-sectional view of an example of the laminated body of the invention is illustrated in FIG. 1, and a schematic top surface view of an example of the patterned optical anisotropic layer is illustrated in FIG. 2. The laminated body of the invention includes a patterned optical anisotropic layer 12 having a first phase difference region 14 and a second phase difference region 15 on a supporter film 13, and a stiff body 17 is attached to the patterned optical anisotropic layer 12 through a first attaching layer 16. Meanwhile, a (light) orientation film that is generally used to control the orientation of the optical anisotropic layer will not be described.

In the laminated body of the invention, the average dimensional change rate per 1% RH of relative humidity at a temperature of 25° C. and a relative humidity in a range of 10% RH to 90% RH is preferably 0.0015% or less, more preferably 0.0010% or less and particularly preferably 0.0005% or less in the pattern cycle direction of the patterned optical anisotropic layer 12.

The stiff body 17 is attached to the patterned optical anisotropic layer 12 through the first attaching layer 16. The stiff body 17 refers to a supporter in which the average dimensional change rate per 1% RH of relative humidity under an environment of 25° C. and a relative humidity in a range of 10% RH to 90% RH is 0.0015% or less.

The thickness of the stiff body 17 is preferably in a range of 20 μm to 250 μm, more preferably in a range of 20 μm to 150 μm, and particularly preferably in a range of 20 μm to 100 μm.

The stiff body 17 is not particularly limited as long as the stiff body has an average dimensional change rate of 0.0015% or less and is stiff enough to withstand tension caused by the dimensional change of the patterned phase difference film due to humidity. An example of the stiff body 17 is a glass substrate or a plastic substrate (particularly an inflexible plastic substrate). The stiff body 17 will be described below in detail.

The first attaching layer 16 attaches the patterned optical anisotropic layer 12 and the stiff body 17, and is made of at least any one of an adhesive and a gluing agent.

The first attaching layer 16 is made of at least any one of an adhesive and a gluing agent, and the material for the first attaching layer is not particularly limited. An example of the first attaching layer 16 is an acrylic adhesive or an epoxy-based adhesive. The adhesive and gluing agent used for the first attaching layer will be described below in detail.

The patterned optical anisotropic layer 12 can be formed of one curable composition or multiple curable compositions mainly containing a liquid crystal compound, and the liquid crystal compound is preferably a liquid crystal compound having a polymerizable group, and is preferably a liquid crystal compound formed of the above-described curable composition. The patterned optical anisotropic layer 12 may have a single layer structure or a laminate structure of two or more layers. The patterned optical anisotropic layer can be formed of one or two compositions mainly containing the liquid crystal compound.

As illustrated in FIG. 2, an example of the patterned optical anisotropic layer 12 is a patterned λ/4 layer in which in-plane slow axes a and b in the first and second phase difference regions 14 and 15 are orthogonal to each other and the in-plane retardation Re is λ/4. When this aspect of patterned optical anisotropic layer is combined with a polarizer, light rays that have passed through the first and second phase difference regions respectively turn into mutually-reversed circularly-polarized states, and form circularly-polarized images for the right eye and the left eye respectively.

The patterned λ/4 layer can be formed by, for example, uniformly forming an orientation film on a surface of the supporter film 13, carrying out an orientation treatment in a direction, orientating the liquid crystal curable composition on an orientation-treated surface, and fixing the liquid crystal curable composition in the oriented state. In one of the first and second phase difference regions 14 and 15, liquid crystals are oriented orthogonally or perpendicularly to an orientation restriction treatment direction (for example, a rubbing direction), that is, orthogonally or perpendicularly oriented, in the other region, liquid crystals are oriented in parallel with or perpendicularly to the orientation restriction treatment direction (for example, a rubbing direction), that is, oriented in parallel or perpendicularly, and the liquid crystals are fixed in the oriented states, whereby the respective phase difference regions can be formed.

The laminated body of the invention is useful as a member for a 3D image display device, particularly for a passive-type 3D image display device. In this aspect, polarized images that have passed through the first and second phase difference regions respectively are recognized as images for the right eye and the left eye through polarization glasses or the like. Therefore, the first and second phase difference regions preferably have mutually equal shapes so as to prevent right and left images from becoming non-uniform, and the first and second phase difference regions are preferably disposed in equal and symmetric patterns respectively.

In the invention, the patterned optical anisotropic layer is not limited to the aspect illustrated in FIG. 2. It is possible to use first and second phase difference regions in which the in-plane retardation is $\lambda/4$ in one of the regions and the in-plane retardation is $3\lambda/4$ in the other region. Furthermore, it is also possible to use first and second phase difference regions 14 and 15 in which the in-plane retardation is $\lambda/2$ in one of the regions and the in-plane retardation is 0 in the other region.

In addition, the in-plane slow axes of individual patterns in the first and second phase difference regions can be adjusted to be in mutually different directions, for example, in mutually orthogonal directions using patterned orientation films or the like. As the patterned orientation film, it is possible to use any of a photo-orientation film that is capable of forming a patterning orientation film through mask exposure, a rubbing orientation film that is capable of forming a patterning orientation film through mask rubbing, and an orientation film in which different types of orientation films (for example, a material oriented orthogonally or in parallel with rubbing) are pattern-disposed through printing or the like. Meanwhile, in a case in which the respective in-plane slow axes in the first and second phase difference regions are mutually orthogonal, the in-plane slow axis in a boundary section preferably has an approximately intermediate value between the in-plane slow axis directions of the first and second phase difference regions, that is, approximately 45 degrees.

The laminated body of the invention is not limited to the aspect simply illustrated in FIG. 1, and may include other members. For example, in an aspect in which the patterned optical anisotropic layer is formed using an orientation film as described above, the orientation film may be provided between the supporter film and the patterned optical anisotropic layer. In addition, the patterned phase difference film in the invention may have a surface layer such as a forward scattering layer, a primer layer, an antistatic layer or a basecoat layer disposed on the supporter film together with a bar coated layer, an antireflection layer, a low reflection layer, an antiglare layer or the like (or in exchange of the above-described layers).

In addition, the laminated body of the invention may further include a supporter film at least on one surface of the stiff body if necessary.

The invention relates to a polarization plate. The polarization plate of the invention includes at least the laminated body of the invention and a polarizer, and the laminated body and the polarizer are attached together through a second attaching layer. The laminated body and the polarizer are preferably attached in an aspect in which the polarizer and the stiff body are attached together through a second attaching layer as exemplified in FIG. 3 or in an aspect in which a protective film in the polarizer and the stiff body are attached together through the second attaching layer as exemplified in FIG. 4.

A second attaching layer 18 attaches the polarizer and the stiff body or the protective film and the stiff body.

The adhering force or gluing force of the second attaching layer 18 is preferably smaller than the adhering force or gluing force of the first attaching layer. When the adhering force or gluing force of the second attaching layer is set to be smaller than the adhering force or gluing force of the first attaching layer, that is, the adhering force or gluing force between the polarizer or the protective film and the stiff body is set to be relatively smaller than the adhering force or gluing force between the patterned optical anisotropic layer and the stiff body, it is possible to decrease the dimensional change of the stiff body 17 caused by the dimensional change of the polarizer or the protective film due to humidity. At the same time, when the adhering force or gluing force between the patterned optical anisotropic layer and the stiff body is set to be relatively larger than the adhering force or gluing force between the polarizer or the protective film and the stiff body, it is possible to decrease the dimensional change of the patterned optical anisotropic layer caused by the dimensional change of the supporter due to humidity. As a result, it is possible to decrease the influence of humidity on the matching of pixels between the patterned optical anisotropic layer and the display panel.

The second attaching layer 18 is made of at least any one of an adhesive and a gluing agent, and the material for the second attaching layer is not particularly limited. An example of the second attaching layer 18 is an acrylic adhesive or an epoxy-based adhesive. The adhesive and gluing agent used for the second attaching layer 18 will be described below in detail.

Figure 5A:
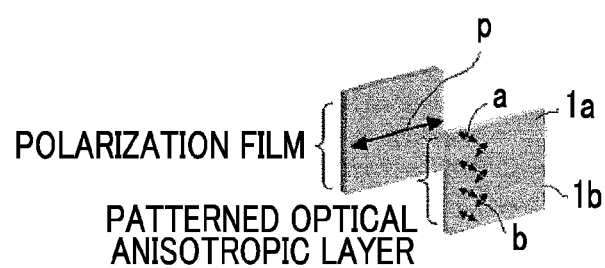
FIG. 5A is a schematic view of an example of a relationship between a polarizer and an optical anisotropic layer.
Figure 5B:
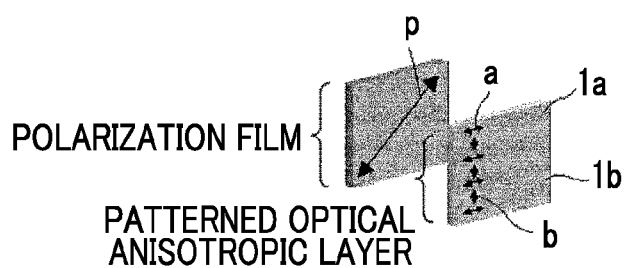
FIG. 5B is a schematic view of an example of a relationship between a polarizer and an optical anisotropic layer.

In the polarization plate of the invention, the in-plane slow axes a and b in the first and second phase difference regions 14 and 15 are disposed respectively at ±45° with respect to a transmission axis p of the polarizer as exemplified in FIG. 5A and FIG. 5B. In the specification, the angle is not required to be strictly ±45°, and the in-plane slow axis is preferably disposed at an angle in a range of 40° to 50° in any one of the first and second phase difference regions 14 and 15, and is preferably disposed at an angle in a range of −50° to −40° in the other region. With the above-described configuration, circularly-polarized images for the right eye and the left eye can be separated. In addition, when a $\lambda/2$ plate is further laminated, the view angle may be further widened.

In the invention, it is possible to use an ordinary linear polarizer as the polarizer. The polarizer may be made of a stretched film or may be a layer formed through coating. An example of the former case is a film obtained by dying a stretched polyvinyl alcohol film with iodine, a dichromatic dye or the like. An example of the latter case is a layer obtained by applying a composition containing a dichromatic liquid crystal pigment and fixing the pigment in a predetermined orientation state.

In addition, the invention relates to a stereoscopic image display device including at least the laminated body of the invention and a display panel driven based on an image signal. The laminated body of the invention is disposed on an image-displaying surface of the display panel and is separated into polarized images (for example, circularly-polarized images) for the right eye and the left eye. An observer observes the polarized images through the polarization plate such as polarization glasses (for example, circular polarization glasses), and recognizes the polarized images as stereoscopic images.

Figure 3:
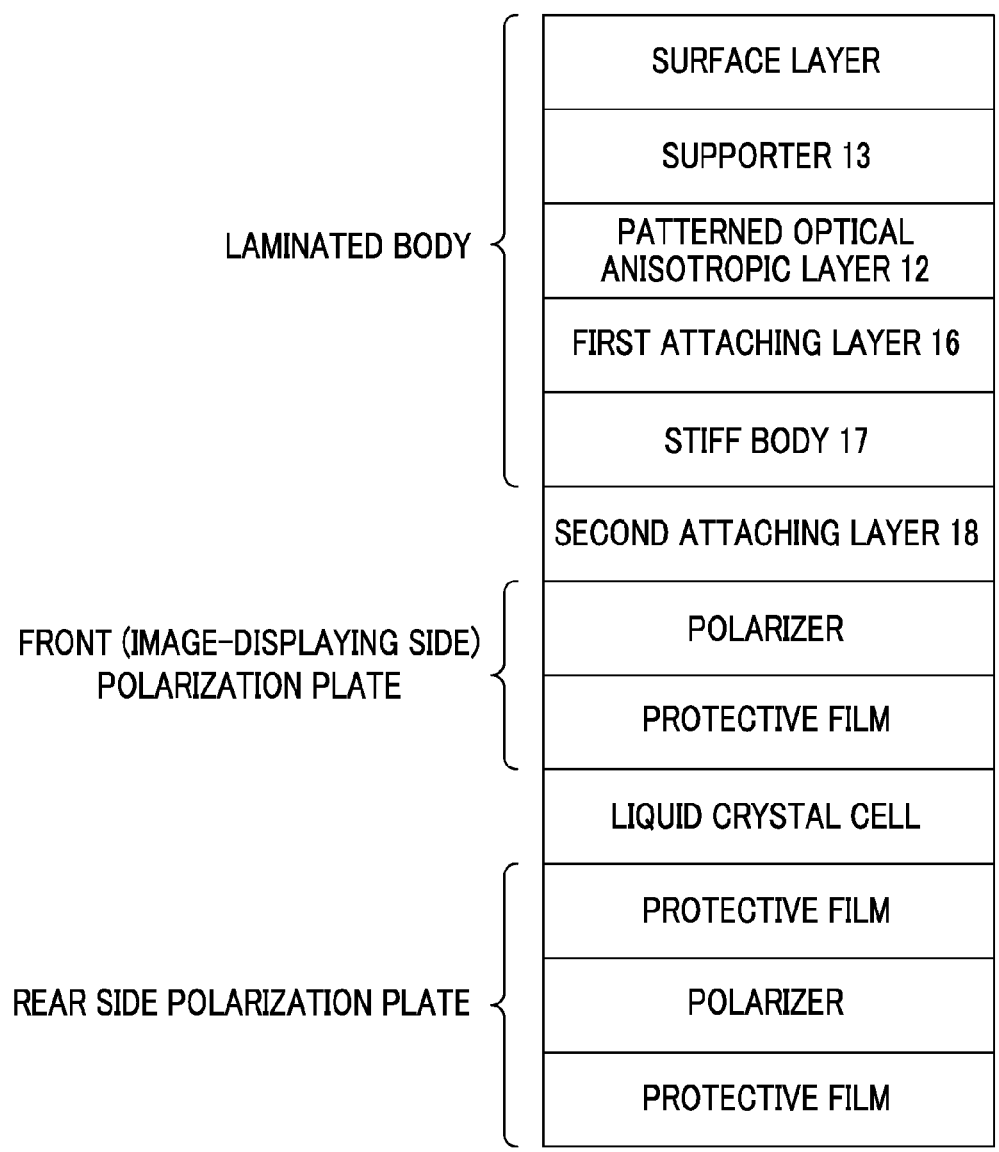
FIG. 3 is a schematic cross-sectional view of an example of a stereoscopic image display device of the invention.
Figure 4:
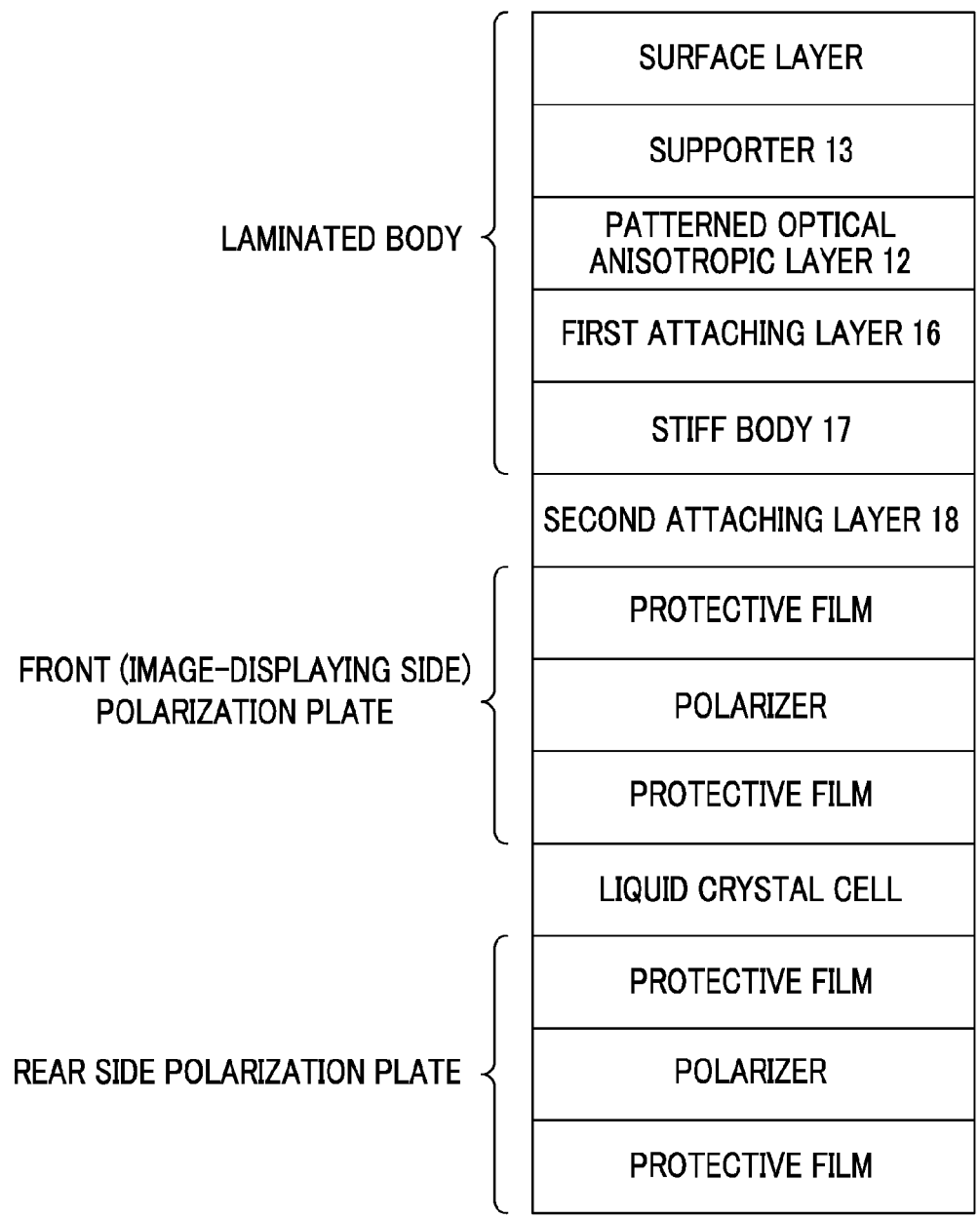
FIG. 4 is a schematic cross-sectional view of another example of the stereoscopic image display device of the invention.

The laminated body of the invention is disposed on the image-displaying surface of the display panel together with the polarizer as illustrated in FIGS. 3 and 4; however, in a case in which the display panel includes the polarizer on the image-displaying side, the polarizer may not be provided. In addition, in an aspect in which the laminated body of the invention is disposed on the display panel including the polarizer on the image-displaying side together with the polarizer as illustrated in FIGS. 2 and 3, the transmittance axis of the polarizer is disposed in synchronization with the transmittance axis of the polarizer disposed on the image-displaying side of the display panel.

In the invention, there is no limitation regarding the display panel. The display panel may be, for example, a liquid crystal panel including a liquid crystal layer, an organic EL display panel including an organic EL layer, or a plasma display panel. In any of the above-described aspects, it is possible to employ a variety of available configurations. In addition, the liquid crystal panel and the like include the polarizer for displaying images on the image-displaying surface, but the above-described function may be achieved through the combination with the polarizer as described above.

An example of the display panel is a transmittance mode liquid crystal panel which includes a pair of polarizers and a liquid crystal cell between the polarizers. Generally, a phase difference film is disposed between each of the polarizers and the liquid crystal cell to compensate for the view angle. There is no particular limitation regarding the configuration of the liquid crystal cell, and it is possible to employ a liquid crystal cell having an ordinary configuration. For example, the liquid crystal cell includes a pair of substrates disposed opposite to each other and a liquid crystal layer sandwiched between the pair of the substrates, and may also include a color filter layer or the like if necessary. There is no particular limitation regarding the driving mode of the liquid crystal cell as well, and it is possible to use a variety of modes such as twisted nematic (TN), super twisted nematic (STN), vertical alignment (VA), in-plane switching (IPS) and optically compensated band cell (OCB).

The invention relates to a stereoscopic image display system including at least the stereoscopic image display device of the invention and a polarization plate disposed on an image-displaying side of the stereoscopic image display device, in which a stereoscopic image is displayed through the polarization plate. An example of the polarization plate disposed at the outside of the stereoscopic image display device on the image-displaying side is polarization glasses worn by an observer. The observer observes polarized images for the right eye and the left eye displayed by the stereoscopic image display device through circularly polarized or linearly polarized glasses, and recognizes the polarized images as stereoscopic images.

Hereinafter, a variety of members and the like used for the patterned phase difference film in the invention will be described in detail.

The Stiff Body:

The laminated body of the invention includes the stiff body attached to the patterned optical anisotropic layer through the first attaching layer. The stiff body is not particularly limited as long as the stiff body has an average dimensional change rate of 0.0015% or less and is stiff enough to withstand tension caused by the dimensional change of the patterned phase difference film due to humidity. The stiff body is preferably a glass substrate or a plastic substrate (particularly an inflexible plastic substrate). An example of the plastic substrate is a film containing an olefin polymer (for example, ZEONOR (manufactured by Zeon Corporation) or ARTON (manufactured by JSR Corporation) that is a norbornene-based film) or a film containing an acryl polymer. Among the above-described substrates, the glass substrate is particularly preferred. The stiff body preferably has an optical transmittance of 80% or more.

The thickness of the stiff body is preferably in a range of 20 μm to 250 μm, more preferably in a range of 20 μm to 150 μm, and particularly preferably in a range of 20 μm to 100 μm. When the thickness exceeds 250 μm, there is a case in which it is not possible to attach the stiff body through a rolling process (roll-to-roll).

The Adhesive and the Gluing Agent:

In the laminated body of the invention, the patterned optical anisotropic layer and the stiff body are attached together through the first attaching layer, and in the polarization plate of the invention, the polarizer and the stiff body or the protective film and the stiff body are attached together through the second attaching layer. The first and second attaching layers are made of any one of an adhesive and a gluing agent.

For the first and second attaching layers, identical adhesives or gluing agents may be used, or different adhesives or gluing agents may be used.

[Adhesive]

Examples of the adhesive include an isocyanate-based adhesive, a polyvinyl alcohol-based adhesive, an epoxy-based adhesive, a zelatine-based adhesive, a vinyl-based latex-based adhesive, an aqueous polyester adhesive and the like. Generally, an adhesive made of an aqueous solution is used as the adhesive.

Particularly, it is possible to preferably use a solventless active energy ray-curable composition (hereinafter, in some cases, simply referred to as "an epoxy-based adhesive composition") containing an alicyclic epoxy compound as the adhesive since a drying process for the attached adhesive is not required. When the solventless active energy ray-curable composition containing an alicyclic epoxy compound is used, it becomes possible to improve the durability of the polarization plate in a strict environment, and a process for drying the adhesive becomes unnecessary, and therefore it is possible to improve the productivity.

Here, the alicyclic epoxy compound refers to a compound directly having an epoxy group in a ring of a saturated cyclic compound and a compound directly having a glycidyl ether group or a glycidyl group in a ring of the saturated cyclic compound. Meanwhile, the alicyclic epoxy compound may have other epoxy groups in the structure.

The alicyclic epoxy compound directly having an epoxy group in a ring of a saturated cyclic compound can be procured using, for example, the method described in Paragraphs [0074] to [0081] of JP2010-091603A.

Specific examples of the alicyclic epoxy compound directly having an epoxy group in a ring of a saturated cyclic compound which is preferably used in the invention include 3,4-epoxy cyclohexyl methyl, 3,4-epoxy cyclohexane carboxylate, 1,2-epoxy-4-vinylcyclohexane, 1,2-epoxy-1- methyl-4-(1-methylepoxy ethyl)cyclohexane, 3,4-epoxy cyclohexyl methyl methacrylate, 4-(1,2-epoxy ethyl)-1,2-epoxy cyclohexane adducts of 2,2-bis(hydroxyl methyl)-1-butanol, ethylene bis(3,4-epoxy cyclohexane carboxylate), oxydiethyelene bis(3,4-epoxy cyclohexane carboxylate), 1,4-cyclo hexane dimethyl bis(3,4-epoxy cyclohexane carboxylate) and 3-(3,4-epoxy cyclohexyl methoxy carbonyl) propyl 3,4-epoxy cyclohexane carboxylate, and the like.

The alicyclic epoxy compound directly having a glycidyl ether group or a glycidyl group in a ring of a saturated cyclic compound can be procured using, for example, the method described in Paragraphs [0083] to [0086] of JP2010-091603A.

Among the above-described alicyclic epoxy compounds, 3,4-epoxy cyclohexyl methyl, 3,4-epoxy cyclohexane carboxylate and a glycidyl etherified hydrogenated substance of bisphenol A are preferred, and 3,4-epoxy cyclohexyl methyl and 3,4-epoxy cyclohexane carboxylate are more preferred since these compounds improve the durability of the polarization plate and the like, exhibit favorable cured substance characteristics or appropriate curability, and can be procured at a relatively low cost.

In addition, the alicyclic epoxy compounds may be solely used respectively, or may be used as a mixture of two or more compounds.

The above-described alicyclic epoxy compound can be easily procured from commercially available products, and examples thereof include "CELLOXIDE", "CYCLOMER" (all manufactured by Daicel Chemical Industries, LTD.) and "CYRACURE" (manufactured by The Dow Chemical Company) all of which are product names.

In the invention, an active energy ray-curable compound other than the alicyclic epoxy compound can be mixed with an epoxy-based adhesive composition. As the active energy ray-curable compound, it is possible to use an epoxy compound other than the alicyclic epoxy compound.

The epoxy compound other than the above-described alicyclic epoxy compound and oligomers thereof can be easily procured from commercially available products, and examples thereof include "EPICOAT" (manufactured by Japan Epoxy Resins Co., Ltd.), "EPICLON" (manufactured by DIC Corporation), "EPO TOHTO" (manufactured by Tohto Kasei Co., Ltd.), "ADEKA RESIN" (manufactured by ADEKA Corporation), "DENACOL" (manufactured by Nagase ChemteX Corporation), "DOW EPOXY" (manufactured by The Dow Chemical Company), "TEPIC" (manufactured by Nissan Chemical Industries, Ltd.) all of which are product names.

The epoxy equivalent weight of the alicyclic epoxy compound and the epoxy compound other than the alicyclic epoxy compound which are used in the invention is generally in a range of 30 g/eq to 2000 g/eq, is preferably in a range of 50 g/eq to 1500 g/eq, and is more preferably in a range of 70 g/eq to 1000 g/eq. Meanwhile, the epoxy equivalent weight is a value measured based on JIS K 7236 (ISO 3001). In addition, when the epoxy compound is a high-purity monomer, it is possible to compute the theoretical amount from the molecular amount.

In addition, as the active energy ray-curable compound, an oxetane compound can also be used. The joint use of the oxetane compound is capable of improving the curing rate of the active energy ray-curable composition. The oxetane compound is a compound having an oxetane ring, and is not particularly limited as long as the oxetane compound is cured by an active energy ray. Examples of the oxetane compound include 1,4-bis{[(3-ethyloxetane-3-yl)methoxy]methyl}benzene, 3-ethyl-3-(2-ethylhexyloxymethyl)oxetane, bis(3-ethyl-3-oxycettanylmethyl)ether, 3-ethyl-3-(phenoxymethyl)oxetane, 3-ethyl-3-(cyclohexyloxymethyl)oxetane, phenol novolak oxetane and 1,3-bis[(3-ethyloxetane-3-yl)-methoxy]benzene, and the like.

The above-described oxetane compound can be procured from commercially available products, and examples thereof include "ARON OXETANE" (manufactured by Toagosei Co., Ltd.), "ETERNACOLL" (manufactured by UBE Industries, Ltd.) all of which are product names.

Regarding the blending proportion of the alicyclic epoxy compound in the active energy ray-curable composition, the content of the alicyclic epoxy compound is preferably in a range of 30 parts by weight to 95 parts by weight, more preferably in a range of 50 parts by weight to 90 parts by weight, and still more preferably in a range of 70 parts by weight to 85 parts by weight in a total content of 100 parts by weight of the active energy ray-curable compound (the alicyclic epoxy compound, the epoxy compound and the oxetane compound other than the alicyclic epoxy compound).

The total amount of chlorine contained in the active energy ray-curable composition containing the alicyclic epoxy compound used in the invention is preferably in a range of 0.1 ppm to 15000 ppm, more preferably in a range of 0.5 ppm to 2000 ppm, and still more preferably in a range of 1.0 ppm to 1000 ppm. Meanwhile, the total amount of chlorine is a value measured based on JIS K 7243-3 (ISO 21627-3).

The hue of the active energy ray-curable composition containing the alicyclic epoxy compound used in the invention is preferably 5 or less, more preferably 3 or less, and still more preferably 1 or less in terms of the Gardner color of the active energy ray-curable composition before being cured.

The active energy ray-curable composition containing the alicyclic epoxy compound used in the invention is a curable composition that is fixed (cured) by the radiation of an active energy ray and supplies an adhering force to two sheets of film sandwiching the cured substance layer.

Examples of the active energy ray being used include X-rays having a wavelength in a range of 1 pm to 10 nm, ultraviolet rays having a wavelength in a range of 10 nm to 400 nm, visible light rays having a wavelength in a range of 400 nm to 800 nm, and the like. Among the above-described rays, ultraviolet rays are preferably used in terms of easy availability, the easy adjustment, stability and curing performance of the active energy ray-curable composition.

A light source being used is not particularly limited, and examples thereof include a low-pressure mercury lamp, a medium-pressure mercury lamp, a high-pressure mercury lamp, an ultrahigh-pressure mercury lamp, a chemical lamp, a black light lamp, a microwave-excited mercury lamp, a metal halide lamp and the like which have a light-emitting distribution of a wavelength of 400 nm or less.

The radiation intensity is determined depending on the active energy ray-curable composition or the radiation time, and is not particularly limited. For example, the radiation intensity is preferably in a range of 0.1 mW/cm$^2$ to 1000 mW/cm$^2$ in a wavelength range effective for the activation of an initiator.

The radiation time is determined depending on the active energy ray-curable composition or the radiation intensity, and is not particularly limited. For example, the radiation intensity is preferably set so that the light integral represented by the product of the radiation intensity and the radiation time reaches a value in a range of 10 mJ/cm$^2$ to 5000 mJ/cm$^2$.

The active energy ray-curable composition containing the alicyclic epoxy compound used in the invention is cured by an active energy ray, and thus preferably contains cationic polymerization initiators blended therein.

The above-described cationic polymerization initiators may be solely used respectively, or may be used as a mixture of two or more cationic polymerization initiators. Among the above-described cationic polymerization initiators, particularly, aromatic sulfonium salt has an ultraviolet absorption characteristic in a wavelength range of 300 nm or more so as to have an excellent curing property and to be capable of supplying a cured substance layer having favorable mechanical strength or adhesion intensity, and is thus preferably used.

The blending amount of the cationic polymerization initiator is generally in a range of 0.5 parts by weight to 20 parts by weight, and preferably in a range of 1 part by weight to 15 parts by weight with respect to a total of 100 parts by weight of the active energy ray-curable compound.

The cationic polymerization initiator can be easily procured from commercially available products, and examples thereof include "KAYARAD" (manufactured by Nippon Kayaku Co., Ltd.), "CYRACURE" (manufactured by Union Carbide Corporation), a photo-acid-generating agent "CPI" (manufactured by San-Apro Ltd.), photo-acid-generating agents "TAZ", "BBI", "DTS" (all manufactured by Midori Kagaku Co., Ltd.), "ADEKA OPTOMER" (manufactured by ADEKA Corporation), "RHODORSIL" (manufactured by Rhodia Inc.) all of which are product names.

The active energy ray-curable composition containing the alicyclic epoxy compound used in the invention can be jointly used with a photosensitizer if necessary. When a photosensitizer is used, the reactivity improves, and it is possible to improve the mechanical strength or adhesion intensity of the cured substance layer.

The photosensitizer is not particularly limited, and examples thereof include a carbonyl compound, an organic sulfur compound, a persulfide, a redox-based compound, an azo and diazo compound, a halogen compound, a photo-reducing pigment, and the like.

The photosensitizer may be solely used respectively, or may be used in a mixture. The content of the photosensitizer is preferably in a range of 0.1 parts by weight to 20 parts by weight in a case in which the content of the active energy ray-curable composition is set to 100 parts by weight.

A variety of additives can be blended with the active energy ray-curable composition used in the invention unless the effects of the invention are not impaired. Examples of a variety of the additives include an ion-trapping agent, an antioxidant, a chain transfer agent, a sensitizer, a tackifier, a thermoplastic resin, a filler, a fluidity adjuster, a plasticizer, a defoamer, and the like.

[Gluing Agent]

It is possible to appropriately select, for example, an acrylic gluing agent made of an acrylic polymer or a gluing agent containing a silicone-based polymer, polyester, polyurethane, polyamide, polyether, a fluorine or rubber-based polymer as the base polymer and use it as the gluing agent. Particularly, a gluing agent that has excellent optical transparency, exhibits appropriate adhesion characteristics such as wettability, agglomerating properties and adhesiveness, and has excellent weather resistance or thermal resistance such as an acrylic gluing agent can be preferably used.

Furthermore, in addition to the above-described gluing agents, a gluing agent having low moisture absorptivity and excellent thermal resistance is preferred in terms of the prevention of foaming phenomenon or peeling phenomenon caused by the absorption of moisture, the prevention of the degradation of optical characteristics or the warpage of the liquid crystal cell caused by thermal expansion difference and the like, and furthermore, the forming property of the liquid crystal display device having high quality and excellent durability.

To suppress the gluing agent from being accompanied by the extension and contraction of the polarization plate, the supporter or the liquid crystal cell or to suppress the stress in the stiff bodies sandwiching the first and/or second attaching layers from being propagated, the storage elastic modulus (G') of the gluing agent at 23° C. is preferably in a range of 20 [MPa] to 100 [MPa], and more preferably in a range of 30 [MPa] to 70 [MPa].

The gluing agent may contain, for example, resins of natural substances or synthetic substances, particularly, a gluing property-supplying resin, a filler made of a glass fiber, glass beads, metal powder, other inorganic powder and the like, additives added to the gluing agent such as a pigment, a colorant and an antioxidant. In addition, the gluing agent may be a gluing agent containing fine particles so as to exhibit light diffusivity.

The exposed surface of the gluing agent is temporarily covered with a separator until being provided for actual use to prevent the contamination of the exposed surface. Then, it is possible to prevent the exposed surface from coming into contact with a gluing layer in an ordinary state of being handled. As the separator, it is possible to use an appropriate separator which complies with the requirements of the related art except for the above-described thickness condition and is obtained by coating, for example, an appropriate tissue-like body such as a plastic film, a rubber sheet, paper, fabric, non-woven fabric, a net, a foam sheet, a metal foil or a laminate thereof with an appropriate peeling agent such as a silicone-based peeling agent, a long-chain alkyl-based peeling agent, a fluorine-based peeling agent or molybdenum sulfide as necessary.

Meanwhile, in the invention, the ultraviolet absorption performance may be provided to the respective layers such as the polarization plate, the laminated body, the first and second attaching layers using a method, for example, in which the layers are treated using an ultraviolet absorbent such as a salicylate ester-based compound, a benzophenol-based compound, a benzotriazole-based compound, a cyanoacrylate-based compound or a nickel complex salt-based compound.

The gluing agent can be provided to the polarization plate or the laminated body using an appropriate method. Examples of the method include a method in which approximately 10% by mass to 40% by mass of a gluing agent solution containing a base polymer or a composition thereof dissolved or dispersed in a solvent made of a single appropriate solvent such as toluene or ethyl acetate or a mixture thereof is prepared, and the gluing agent solution is directly provided onto the polarization plate or an optical member using an appropriate development method such as a casting method or a coating method, a method in which a gluing agent layer is formed on a separator according to what has been described above, and the gluing agent layer is moved and attached to the polarization plate or the optical member, and the like.

Patterned Optical Anisotropic Layer:

In the invention, the patterned optical anisotropic layer includes a first phase difference region and a second phase difference region having mutually different in-plane slow axis directions and/or in-plane retardation, and the first and second phase difference regions are alternately disposed in a plane. An example of the patterned optical anisotropic layer is an optical anisotropic layer in which the first and second phase difference regions have Re of approximately λ/4 respectively, and the in-plane slow axes are orthogonal to each other. There are a variety of methods for forming the above-described patterned optical anisotropic layer; however, in the invention, a method for forming the patterned optical anisotropic layer by polymerizing a rod-shaped liquid crystal compound having a polarizable group in a state of being horizontally oriented and a discotic liquid crystal compound in a state of being vertically oriented, and fixing the rod-shaped liquid crystal compound and the discotic liquid crystal compound.

The sole patterned optical anisotropic layer may have Re of approximately λ/4, and in this case, Re (550) is preferably approximately λ/4±30 nm, more preferably in a range of 110 nm to 165 nm, still more preferably in a range of 120 nm to 150 nm, and particularly preferably in a range of 125 nm to 145 nm Meanwhile, in the specification, the in-plane retardation Re of λ/4 refers to a value having a width in a range of ¼ of the wavelength λ±approximately 30 nm unless particularly otherwise described, and the in-plane retardation Re of λ/2 refers to a value having a width in a range of ½ of the wavelength λ±approximately 30 nm unless particularly otherwise described. In addition, a majority of commercially available supporters have a positive Rth. In a case in which the patterned optical anisotropic layer is formed on a supporter having a positive Rth, the Rth (550) of the patterned optical anisotropic layer is preferably a negative value, is preferably in a range of −80 nm to −50 nm, and more preferably in a range of −75 nm to −60 nm.

Generally, the liquid crystal compounds can be classified into the rod-shaped liquid crystal compound and the discotic liquid crystal compound depending on their shapes. Furthermore, the rod-shaped liquid crystal compound and the discotic liquid crystal compound respectively have a low molecule type and a high molecule type. The high molecule generally refers to a molecule having a degree of polarization of 100 or more (Polymer Physics and Phase Transition Dynamics by Masao Doi, page 2, Iwanami Shoten, Publishers, 1992). In the invention, any liquid crystal compound can be used, but the rod-shaped liquid crystal compound and the discotic liquid crystal compound are preferably used. Two or more rod-shaped liquid crystal compounds, two or more discotic liquid crystal compound, or a mixture of the rod-shaped liquid crystal compound and the discotic liquid crystal compound may be used. Since the temperature change or the humidity change can be decreased, the patterned optical anisotropic layer is more preferably formed using the rod-shaped liquid crystal compound and the discotic liquid crystal compound having a reactive group, and it is more preferable that at least a single liquid crystal molecule have two or more reactive groups in either or both liquid crystal compounds. The liquid crystal compound may be a mixture of two or more liquid crystal compounds, and in this case, at least a single liquid crystal compound preferably has two or more reactive groups.

As the rod-shaped liquid crystal compound, for example, the liquid crystal compounds described in JP1999-513019A (JP-H11-513019A) or JP2007-279688A can be used, and as the discotic liquid crystal compound, for example, the liquid crystal compounds described in JP2007-108732A or JP2010-244038A can be preferably used, but the liquid crystal compounds are not limited thereto.

The liquid crystal compound also preferably has two or more reactive groups having different polymerization conditions. In this case, it becomes possible to produce a phase difference layer including a high molecule with an unreacted reactive group by selecting conditions and polymerizing only part of a plurality of reactive groups. The polymerization conditions being used may be a wavelength range of ionizing radiation used for polymerization fixing, may be a difference in the polymerization mechanism being used, and preferably, may be a combination of a radical reactive group and a cationic reactive group that can be controlled using the type of an initiator being used. A combination in which the radical reactive group is an acryl group and/or a methacryl group and the cationic group is a vinyl ether group, an oxetane group and/or an epoxy group is particularly preferred since the reactivity is easy to control.

The optical anisotropic layer can be formed using a variety of methods in which an orientation film is used, and there is no particular limitation with the manufacturing method.

A first aspect is a method in which a plurality of actions having an effect on the control of the orientation of liquid crystals is used, and then a part of the actions is lost using an external stimulus (thermal treatment or the like), thereby making a predetermined orientation control action dominant. For example, liquid crystals are put into a predetermined orientation state using the combined actions of the orientation control performance by an orientation film and the orientation control performance of an orientation control agent added to the liquid crystal compound, the liquid crystals are fixed so as to form a phase difference region, then, a part of the actions (for example, the action by the orientation control agent) is lost using an external stimulus (thermal treatment or the like) so as to make the other orientation control action (the action by the orientation film) dominant, thereby realizing another orientation state, and the orientation state is fixed so as to form another phase difference region. For example, in a predetermined pyridinium compound or imidazolium compound, a pyridinium group or an imidazolium group is hydrophilic, and is thus eccentrically present on the surface of a hydrophilic polyvinyl alcohol orientation film. Particularly, when the pyridinium group, furthermore, an amino group that is a substitute of an acceptor of a hydrogen atom is substituted, an intermolecular hydrogen bond is generated between the amino group and polyvinyl alcohol, the amino group is eccentrically present on the surface of the orientation film at a higher density, and a pyridinium derivative is oriented in a direction orthogonal to the main chain of polyvinyl alcohol due to the effect of the hydrogen bond, and therefore the orthogonal orientation of liquid crystals is promoted in a rubbing direction. Since the pyridinium derivative has a plurality of aromatic rings in the molecule, a strong intermolecular π-π interaction is caused between the pyridinium derivative and the above-described liquid crystal, particularly, the discotic liquid crystal compound, and orthogonal orientation is caused in the vicinity of the interface of the orientation film with the discotic liquid crystal. Particularly, when a hydrophobic aromatic ring is coupled with the hydrophilic pyridinium group, there is another effect that vertical orientation is caused by the effect of the hydrophobicity. However, when the pyridinium derivative is heated so as to be hotter than a certain temperature, the hydrogen bond is broken, the density of the pyridinium compound and the like on the surface of the orientation film decreases, and the action is lost. As a result, the liquid crystals are oriented by the restraining force of the rubbing orientation film, and the liquid crystals turn into a parallel orientation state. The details of the above-described method are described in the specification of JP2010-141346A, and the content thereof is incorporated in the present specification for reference.

A second aspect is an aspect in which a patterned orientation film is used. In this aspect, a patterned orientation film having mutually different orientation control performances is formed, a liquid crystal compound is disposed on the patterned orientation film, and liquid crystals are oriented. The liquid crystals are controlled to be oriented by the respective orientation control performances of the patterned orientation film, thereby achieving mutually different orientation states. Patterns of the first and second phase difference regions are formed in accordance with the patterns of the orientation film by fixing the respective orientation states. The patterned orientation film can be formed using a printing method, mask rubbing against the rubbing orientation film, mask exposure against an optical orientation film, or the like. In addition, the patterned orientation film can be also formed by uniformly forming the orientation film, and separately printing additives (for example, the above-described onium salt or the like) having an effect on the orientation control performance in a predetermined pattern. A method in which the printing method is used is preferably since a large-scale facility is not required and the manufacturing is easy. The details of the above-described method are described in the specification of JP2010-173077A, and the content thereof is incorporated in the present specification for reference.

In addition, the first and second aspects may be jointly used. An example is the addition of a photo-acid-generating agent to the orientation film. In this example, a photo-acid-generating agent is added to the orientation film, and the photo-acid-generating agent is decomposed by pattern exposure, thereby forming a region in which an acidic compound is generated and a region in which an acidic compound is not generated. In a portion not irradiated with light, the photo-acid-generating agent is rarely decomposed, the interaction among the orientation film material, liquid crystals and the orientation control agent added as desired has a dominant effect on the orientation state, and the liquid crystals are oriented so that the slow axes are orthogonal to the rubbing direction. When light is radiated to the orientation film, and an acidic compound is generated, the interaction is no longer dominant, the rubbing direction of the rubbing orientation film has a dominant effect on the orientation state, and the liquid crystals are oriented in parallel with the slow axes being in parallel with the rubbing direction. A water-soluble compound is preferably used as the photo-acid-generating agent used for the orientation film. Examples of an available photo-acid-generating agent include the compounds described in Prog. Polym. Sci., Vol. 23, page 1485 (1998). As the photo-acid-generating agent, pyridinium salt, iodonium salt and sulfonium salt are particularly preferably used. The details of the above-described method are described in the specification of JP2010-289360A, and the content thereof is incorporated in the present specification for reference.

Furthermore, as a third aspect, there is a method in which a discotic liquid crystal compound having polymerizable groups (for example, an oxetanyl group and a polymerizable ethylenic unsaturated group) with mutually different polymerization properties is used. In this aspect, the discotic liquid crystal compound is put into a predetermined orientation state, and then, light radiation and the like are carried out under a condition in which a polymerization reaction of only one polymerizable group proceeds, thereby forming a pre optical anisotropic layer. Next, mask exposure is carried out under a condition in which the polymerization of the other polymerizable group is allowed (for example, in the presence of a polymerization initiator initiating the polymerization of the other polymerizable group). The orientation state of the exposed portion is fully fixed, and a phase difference region having a predetermined Re is formed. In a non-exposed region, the reaction of one reactive group proceeds, but the other reactive group remains unreacted. Therefore, when the discotic liquid crystal compound is heated to a temperature that is higher than the isotropic phase temperature and allows the reaction of the other reactive group to proceed, the non-exposed region is fixed in an isotropic phase state, that is, Re reaches 0 nm.

Regarding the supporter (supporter film) available in the invention, there is no particular limitation with the material. A polymer film having a low retardation is preferably used, and specifically, a film having an absolute value of the in-plane retardation of approximately 10 nm or less is preferably used. In an aspect in which a protective film for a polarization film is disposed between the polarization film and the patterned phase difference film as well, a polymer film with a low retardation is preferably used as the protective film, and the specific range is as described above.

Examples of a material forming the supporter film available in the invention include polyester-based polymers such as polycarbonate-based polymers, polyethylene terephthalate and polyethylene naphthalate, acrylic polymers such as polymethyl methacrylate, styrene-based polymers such as polystyrene, and acrylonitrile and styrene copolymer (AS resin), and the like. In addition, examples thereof also include polyolefins such as polyethylene and polypropylene, polyolefin-based polymers such as ethylene and propylene copolymers, amide-based polymers such as vinyl chloride-based polymers, nylon and aromatic polyamides, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxy methylene-based polymers, epoxy-based polymers, and polymers obtained by mixing the above-described polymers. In addition, the high molecule film of the invention can also be formed as a cured layer of an ultraviolet curing or thermosetting resin such as acrylic resin, urethane-based resin, acryl urethane-based resin, epoxy-based resin or silicone-based resin.

In addition, as a material for the film, a thermoplastic norbornene-based resin can be preferably used. Examples of the thermoplastic norbornene-based resin include ZEONEX, ZEONOR (manufactured by ZEON Corporation), ATONE (manufactured by JSR Corporation), and the like.

In addition, as a material for the film, it is possible to preferably use a cellulose-based polymer (hereinafter referred to as cellulose acylate) represented by triacetyl cellulose which have thus far been used as a transparent protective film of the related art for the polarization plate.

There is no particular limitation with the method for manufacturing the supporter film, and the supporter film may be manufactured using a solution film-forming method or a fusion film-forming method. In addition, for the adjustment of the retardation, an extended film that has been subjected to an extension treatment may be used.

There is no particular limitation with the thickness of the patterned optical anisotropic layer formed in the above-described manner, but the thickness is preferably in a range of 0.1 µm to 10 µm, and more preferably in a range of 0.5 µm to 5 µm.

Polarizer:

An ordinary polarizer can be used as the polarizer. For example, a polarizer film made of a polyvinyl alcohol film or the like dyed with iodine or dichromatic pigment can be used.

Polarizer-Protecting Film:

A polymer coating layer or a film laminate layer can be provided as the protective film for the polarizer. An appropriate transparent material can be used as a transparent polymer or a film material forming the polarization plate-protecting film, but a material having excellent transparency, mechanical strength, thermal stability, moisture-shielding properties and the like can be preferably used. Examples of a material that forms the transparent protective film include polyester-based polymers such as polyethylene terephthalate or polyethylene naphthalate, cellulose-based polymers such as cellulose diacetate or cellulose triacetate, acrylic polymers such as polymethyl methacrylate, styrene-based polymers such as polystyrene, and acrylonitrile and styrene copolymer (AS resin), polycarbonate-based polymers, and the like. In addition, examples of a polymer forming the transparent protective film include polyolefin-based polymers such as polyethylene, polypropylene, polyolefin having a cyclo-based or norbornene structure, ethylene and propylene copolymers, amide-based polymers such as vinyl chloride-based polymers, nylon and aromatic polyamides, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxy methylene-based polymers, epoxy-based polymers, the polymers described in JP2001-343529A, and blended substances of the above-described polymers. The transparent protective film can also be formed as a cured layer of a thermosetting or ultraviolet curing resin such as acrylic resin, urethane-based resin, acryl urethane-based resin, epoxy-based resin or silicone-based resin.

While it is possible to appropriately use a variety of the above-described polymer films depending on purposes as the protective film, a cellulose-based polymer is preferred in terms of polarization characteristics, durability, manufacturing aptitude and the like, and particularly, triacetyl cellulose is preferably used.

The thickness of the protective film can be appropriately determined, and is generally in a range of approximately 1 µm to 500 µm in terms of workability such as strength and handling properties, thin film properties, and the like. Particularly, the thickness is preferably in a range of 1 µm to 300 µm, and more preferably in a range of 5 µm to 200 µm.

Liquid Crystal Cell:

The liquid crystal cell used in the stereoscopic image display device used in the stereoscopic image display system of the invention is preferably a VA-mode liquid crystal cell, an OCB-mode liquid crystal cell, an IPS-mode liquid crystal cell or a TN-mode liquid crystal cell, but the cell is not limited thereto.

In the TN-mode liquid crystal cell, when no voltage is applied, the rod-shaped liquid crystal molecules are oriented substantially horizontally, and furthermore, are twisted at an angle in a range of 60° to 120°. The TN-mode liquid crystal cell is most widely used in a color TFT liquid crystal display device, and is described in a number of publications.

In the VA-mode liquid crystal cell, when no voltage is applied, the rod-shaped liquid crystal molecules are oriented substantially vertically. Examples of the VA-mode liquid crystal cell include (1) a narrowly-defined VA-mode liquid crystal cell (described in JP1990-176625A (JP-H2-176625A)) in which the rod-shaped liquid crystal molecules are oriented substantially vertically when no voltage is applied, and are oriented substantially horizontally when a voltage is applied, (2) an (MVA-mode) liquid crystal cell obtained by making the VA mode into multi domains to enlarge the view angle (described in SID97, Digest of tech.Papers (proceedings) 28 (1997) 845), (3) an (n-ASM-mode) liquid crystal cell in which the rod-shaped liquid crystal molecules are oriented substantially vertically when no voltage is applied, and are twisted and oriented in multi domains when a voltage is applied (described in proceedings 58 to 59 (1998) of JLCS Conference), and (4) a SURVIVAL-mode liquid crystal cell (presented at LCD International 98).

In addition, the VA-mode liquid crystal cell may be a patterned vertical alignment (PVA)-type liquid crystal cell, an optical alignment-type liquid crystal cell, or a polymer-sustained alignment (PSA)-type liquid crystal cell. The details of the above-described mode are described in JP2006-215326A and JP2008-538819A.

In the IPS-mode liquid crystal cell, the rod-shaped liquid crystal molecules are oriented substantially in parallel with the substrate, and the liquid crystal molecules are responded in a planar manner when an electric field in parallel with the substrate surface is applied. The IPS mode displays black in a state in which no electric field is applied, and the absorption axes in a pair of top and bottom polarization plates are orthogonal to each other. Methods for improving the view angle by reducing light leakage in an inclined direction while black is displayed using an optical compensation sheet are described in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

Polarization Plate for the Stereoscopic Image Display System

In the stereoscopic image display system of the invention, an image is recognized through the polarization plate to let a viewer recognize a stereoscopic image particularly called a 3D image. An aspect of the polarization plate is polarization glasses. In an aspect in which circularly-polarized images for the right eye and the left eye are formed using the phase difference plate, circularly-polarized glasses are used, and in an aspect in which linearly-polarized images are formed, linear glasses are used. The polarization glasses are preferably configured so that image light for the right eye emitted from any one of the first and second phase difference regions in the optical anisotropic layer penetrates right eye glass and is blocked by left eye glass, and image light for the left eye emitted from the other of the first and second phase difference regions penetrates the left eye glass and is blocked by the right eye glass.

The polarization glasses forms polarization glasses by including a phase difference functional layer and a linear polarizer. Meanwhile, other members having the same function as the linear polarizer may be used.

A specific configuration of the stereoscopic image display system of the invention which includes the polarization glasses will be described. First, in the phase difference plate, the first phase difference region and the second phase difference region having different polarization conversion functions are provided on a plurality of first lines and a plurality of second lines (for example, on odd-number lines and even-number lines in the horizontal direction when the lines are along the horizontal direction, and on odd-number lines and even-number lines in the vertical direction when the lines are along the vertical direction) in which image display panels are alternately repeated. In a case in which circularly-polarized light is used for displaying, the phase differences in both the first phase difference region and the second phase difference region are preferably λ/4, and the slow axes are more preferably orthogonal to each other in the first phase difference region and the second phase difference region.

In a case in which circularly-polarized light is used, the phase differences are set to λ/4 in both the first phase difference region and the second phase difference region, and an image for the right eye is displayed on the odd-number lines in the image display panel. When the slow axis in the odd-number line phase difference region is in a 45-degree direction, it is preferable to dispose λ/4 plates both in the right eye glass and the left eye glass of the polarization glasses, and the slow axis of the λ/4 plate in the right eye glass of the polarization glasses may be fixed at, specifically, approximately 45 degrees. In addition, in the above-described status, similarly, when an image for the left eye is displayed on the even-number lines of the image display panel, and the slow axis in the even-number line phase difference region is in a 135-degree direction, the slow axis in the left eye glass of the polarization glasses may be fixed at, specifically, approximately 135 degrees.

Furthermore, in the above-described example, the angle of the slow axis fixing the right eye glass is preferably close to accurately 45 degrees in the horizontal direction from the viewpoint that, in the patterned phase difference film, image light is once emitted as circularly-polarized light and the polarization state is returned to the original state using the polarization glasses. In addition, the angle of the slow axis fixing the left eye glass is preferably close to accurately 135 degrees (or −45 degrees) horizontally.

In addition, in a case in which the image display panel is, for example, a liquid crystal display panel, the absorption axis direction of the front polarization plate in the liquid crystal display panel is generally the horizontal direction, the absorption axis in a linear polarizer in the polarization glasses is preferably in a direction orthogonal to the absorption axis direction of the front polarization plate, and the absorption axis in the linear polarizer in the polarization glasses is more preferably in the vertical direction.

In addition, the absorption axis direction of the front polarization plate in the liquid crystal display panel and the respective slow axes in the odd-number line phase difference regions and the even-number line phase difference regions in the patterned phase difference film preferably form 45 degrees in terms of the polarization conversion efficiency.

Meanwhile, the preferable disposition of the polarization glasses, the patterned phase difference film, and the liquid crystal display device is disclosed in, for example, JP2004-170693A.

Examples of the polarization glasses include the polarization glasses described in JP2004-170693A and commercially available products such as an accompanying item of ZM-M220W (manufactured by Zalman Tech co., Ltd.) and an accompanying item of 55LW5700 (manufactured by LG Electronics).

EXAMPLES

The invention will be described in more detail based on the following examples. Materials, used amounts, proportions, treatment contents, treatment orders and the like described in the following examples can be appropriately altered within the scope of the technical concept of the invention. Therefore, the ranges of the invention are not supposed to be interpreted restrictively by the examples described below.

Example 1

Production of Laminate Body 1

A patterned phase difference film attached to the outermost surface of 32ZP2 (manufactured by Toshiba) was peeled off, and furthermore, a gluing agent was removed. The film was used as a patterned phase difference film 1. The patterned phase difference film 1 was provided with an antireflection layer on an image-displaying side, and a patterned optical anisotropic layer on a light source side.

A glass plate having a thickness of 150 μm was prepared, and the glass plate was attached to the patterned optical anisotropic layer side of the patterned phase difference film 1 using a commercially available acrylic gluing agent 1, thereby obtaining a laminated body 1 of a patterned phase difference film and the glass plate.

Production of Laminated Body 2

A glass plate having a thickness of 150 μm was prepared, the glass plate was attached to the patterned optical anisotropic layer side of the patterned phase difference film 1 using the following epoxy-based adhesive composition, and then the adhesive composition was cured by radiating light from the glass plate side using a metal halide lamp so that the light integral reached 600 mJ/cm$^2$ at a wavelength in a range of 320 nm to 400 nm, thereby obtaining a laminated body 2 of the patterned phase difference film and the glass plate. Meanwhile, the adhering force of the following epoxy-based adhesive used in the production of the laminated body 2 was stronger than the gluing force of the commercially available acrylic gluing agent 1 used in the production of the laminated body 1.

<Epoxy-Based Adhesive Composition>

| | |
|---|---|
| 3,4-epoxy cyclohexyl methyl 3,4-epoxy cyclohexane carboxylate | 40 parts by mass |
| bisphenol A-type epoxy resin | 60 parts by mass |
| diphenyl[4-(phenylthio)phenyl]sulfonium hexafluoro antimonate (cationic polymerization initiator) | 4.0 parts by mass |
| Benzoin methyl ether (photosensitizer) | 1.0 part by mass |

The epoxy equivalent weights of the 3,4-epoxy cyclohexyl methyl and the 3,4-epoxy cyclohexane carboxylate were 126 g/eq, and the epoxy equivalent weight of the bisphenol A-type epoxy resin was 187 g/eq. In addition, the total amount of chlorine in the epoxy-based adhesive composition was 840 ppm, the viscosity measured at 25° C. and 60 rpm in a B-type viscometer was 3000 mPa·s. Meanwhile, the total amount of chlorine in the epoxy-based adhesive composition was based on JIS K 7243-3 (ISO 21627-3), and was measured using a titration method in which a silver nitrate solution was used.

Production of Laminated Body 3

In the production of the laminated body 1, a laminated body 3 of the patterned phase difference film and the glass plate was produced using the same method as for the laminated body 1 except for the fact that the acrylic gluing agent 1 was changed to an acrylic gluing agent 2 having a stronger gluing force than the acrylic gluing agent 1 used for the production of the laminated body 1 in the production of the laminated body 1. Meanwhile, the gluing force of the acrylic gluing agent 2 used for the production of the laminated body 3 was weaker than the adhering force of the epoxy-based adhesive used for the production of the laminated body 2.

(Method for Measuring the Dimensions of the Laminated Bodies and the Patterned Phase Difference Films)

A measurement sample was prepared, and the dimension (L) in the pattern cycle direction of the patterned optical anisotropic layer in the measurement sample was measured using a precise scale or measurement device. After the measurement sample was left to stand for two days under an environment of 25° C. and 10% RH, the dimension (A) in the pattern cycle direction of the patterned optical anisotropic layer in the measurement sample under the environment of 25° C. and 10% RH was measured. Subsequently, the measurement sample was left to stand for two days under an environment of 25° C. and 90% RH, and then the dimension (B) in the pattern cycle direction of the patterned optical anisotropic layer in the measurement sample under the environment of 25° C. and 90% RH was measured. An average dimensional change rate per 1% RH of humidity at a temperature of 25° C. and a relative humidity in a range of 10% RH to 90% RH was computed using the measured L, A, and B.

The measurement results of the average dimensional change per 1% RH of humidity at 25° C. and a humidity in a range of 10% RH to 90% RH in the pattern cycle direction of the patterned optical anisotropic layer for the laminated bodies 1 to 3 and the patterned phase difference film 1 are described in the following table.

TABLE 1

| | | Average dimensional change rate per 1% RH of humidity at a temperature of 25° C. and a relative humidity of 10% RH to 90% RH in pattern cycle direction of the patterned optical anisotropic layer |
|---|---|---|
| Example 1 | Laminated body 1 | 0.0015% |
| Example 2 | Laminated body 2 | 0.0002% |
| Example 3 | Laminated body 3 | 0.0013% |
| Comparative Example 1 | Patterned phase difference film 1 | 0.0048% |

For the laminated bodies 1 to 3 of Examples 1 to 3, it is comprehensible that the average dimensional change rates were smaller than that of the patterned phase difference film 1 of Comparative Example 1 since the patterned phase difference film was attached to the glass plate the dimensions of which was rarely changed due to humidity. In addition, it is comprehensible that the rankings of the average dimensional change rates of the laminated bodies 1 to 3 are determined depending on the rankings of the intensities of the adhering forces of the used adhesives and the gluing forces of the used gluing agents.

Production of a Liquid Crystal Display Device 1

A patterned phase difference film attached to the outermost surface of 32ZP2 (manufactured by Toshiba) was peeled off. Subsequently, the laminated body 1 was attached to the image-displaying polarization plate using the same acrylic gluing agent 1 as the gluing agent used for the production of the laminated body 1, thereby producing a liquid crystal display device 1.

Production of a Liquid Crystal Display Device 2

A liquid crystal display device 2 was produced using the same method except for the fact that the laminated body 2 was used instead of the laminated body 1 in the production of the liquid crystal display device 1.

Production of a Liquid Crystal Display Device 3

A liquid crystal display device 3 was produced using the same method except for the fact that the laminated body 3 was used instead of the laminated body 1 in the production of the liquid crystal display device 1.

Production of a Liquid Crystal Display Device 4

A liquid crystal display device 4 was produced using the same method except for the fact that the laminated body 3 was used instead of the laminated body 1, and furthermore, the same acrylic gluing agent 2 as the gluing agent used for the production of the laminated body 3 was used to attach the image-displaying polarization plate and the laminated body 3 in the production of the liquid crystal display device 1.

Production of a Liquid Crystal Display Device 5

32ZP2 (manufactured by Toshiba) was used as the liquid crystal display device 5.

(Evaluation)

After the produced liquid crystal display devices 1 to 5 were left to stand for four days under three conditions of an environment of 25° C. and 55% RH, an environment of 25° C. and 10% RH, and an environment of 25° C. and 90% RH respectively, the following measurements and evaluations were carried out under the respective conditions.

(1) Front Surface Crosstalk 3D glasses accompanied by 32ZP2 (manufactured by Toshiba) and a measurement device (BM-5A manufactured by Topcon Corporation) were disposed on the front surface of the liquid crystal display device displaying a stripe image in which black stripes and white stripes were alternately arrayed in the vertical direction. The measurement device was placed at a location aligned with a side of the 3D glasses on which white stripes were viewable, and the front surface brightness C was measured. Subsequently, a stripe image in which the locations of white and black were switched was displayed, the front surface brightness D was measured in the same manner using the same side of the glasses as previous, and the left eye crosstalk was computed using the following formula.

Crosstalk=front surface brightness $D$/front surface brightness $C$×100%

(2) 3D Display Variation (Forcible Evaluation)

The 3D display variation was forcibly evaluated using an image in which the 3D display variation was easily viewable. A stripe image in which black stripes and white stripes were alternately arrayed in the vertical direction was displayed on the liquid crystal display device, 3D glasses were mounted, a side of the glasses on which white stripes were viewable on the front surface was shielded, the liquid crystal display device was observed, and the evaluation was carried out using the following criteria. In this evaluation, a black display portion in the display plane indicates that there is no or slight crosstalk, and a portion in which brightness leakage was viewable and a white display portion indicate that there is crosstalk.

(Evaluation Using a 3D Video Source)

A commercially available 3D video source was displayed, the liquid crystal display device was observed from the front surface from a distance as distant as 2.5 times the height of the display unit in the liquid crystal display device, and the evaluation was carried out using the following criteria.

A: In the forcible evaluation, the entire display surface displays black, there is no viewable crosstalk or there is a permissible extent of viewable small brightness leakage, and there is no viewable crosstalk in the evaluation in which the 3D video source is used.

B: In the forcible evaluation, there is viewable brightness leakage, but there is seldom viewable crosstalk in the evaluation in which the 3D video source is used, which can be determined to be permissible in actual use.

C: In the forcible evaluation, there is viewable brightness leakage, and there is viewable crosstalk in the evaluation in which the 3D video source is used, which is not permissible.

anisotropic layer and the glass plate is stronger than the gluing force between the image-displaying side polarization plate and the laminated body, the durability performance against a low humidity and a high humidity is excellent.

In the liquid crystal display devices 1 to 5, while the acrylic gluing agent or the epoxy-based adhesive was used as the first attaching layer, and the acrylic gluing agent was used as the second attaching layer, even in aspects in which any one of acrylic gluing agents, silicone-based gluing agents, epoxy-based adhesives and isocyanate adhesives was used as the first attaching layer and the second attaching layer, the same effects as in the liquid crystal display devices 1 to 5 could be confirmed.

Production of a Liquid Crystal Display Device 6

A polarizer having a thickness of 20 μm was produced by adsorbing iodium to an extended polyvinyl alcohol film according to Example 1 in JP2001-141926A. A "Z-TAC" (manufactured by Fujifilm Corporation) was attached to one surface of the polarizer using a polyvinyl alcohol-based adhesive, and furthermore, the laminated body 1 was

TABLE 2

| | Configuration of liquid crystal display device | | | | |
|---|---|---|---|---|---|
| | Type of laminated body | Gluing agent used for attachment between "image-displaying polarization plate" and "laminated body" | Environment conditions | Front surface crosstalk | 3D display variation |
| Liquid crystal display device 1 | Laminated body 1 | Acrylic gluing agent 1 used to produce laminated body 1 | 25° C. 55% | 0.9% | ○ |
| | | | 25° C. 10% | 1.4% | Δ |
| | | | 25° C. 90% | 1.3% | Δ |
| Liquid crystal display device 2 | Laminated body 2 | Acrylic gluing agent 1 used to produce laminated body 1 | 25° C. 55% | 0.9% | ○ |
| | | | 25° C. 10% | 0.9% | ○ |
| | | | 25° C. 90% | 0.9% | ○ |
| Liquid crystal display device 3 | Laminated body 3 | Acrylic gluing agent 1 used to produce laminated body 1 | 25° C. 55% | 0.9% | ○ |
| | | | 25° C. 10% | 1.1% | ○ |
| | | | 25° C. 90% | 1.1% | ○ |
| Liquid crystal display device 4 | Laminated body 4 | Acrylic gluing agent 2 used to produce laminated body 3 | 25° C. 55% | 0.9% | ○ |
| | | | 25° C. 10% | 1.3% | Δ |
| | | | 25° C. 90% | 1.3% | Δ |
| Liquid crystal display device 5 | (product form) | (product form) | 25° C. 55% | 0.9% | ○ |
| | | | 25° C. 10% | 13% | X |
| | | | 25° C. 90% | 8.9% | X |

It is found from Table 2 that, in the liquid crystal display devices 1 to 4 in which the laminated body including the patterned phase difference film and the stiff body is used, the influence of durability performance against a low humidity and a high humidity, that is, the extension and contraction of the supporter film, the polarizer and the like is reduced compared with the liquid crystal display device 5 in which the laminated body is not used. In addition, it is found that, when the laminated body having an average dimensional change rate per 1% RH of humidity at a temperature of 25° C. and a relative humidity in a range of 10% RH to 90% RH of 0.0015% or less in a patterned cyclic direction of the patterned optical anisotropic layer is used, the durability performance against a low humidity and a high humidity is excellent.

In addition, it is found that, while the liquid crystal display devices 3 and 4 have the same configuration except for the fact that the second attaching layers attaching the image-displaying side polarization plate and the laminate are different, the liquid crystal display device 3 has superior durability performance against a low humidity and a high humidity. Based on the above-described result, it is found that, when the gluing force between the patterned optical attached to the other surface using the same acrylic gluing agent 1 as the acrylic gluing agent used for the production of the laminated body 1.

A polarization plate attached to the image-displaying side of 32ZP2 (manufactured by Toshiba) was peeled off, and the previously produced polarization plate was attached, thereby producing a liquid crystal display device 6.

Production of a Liquid Crystal Display Device 7

A liquid crystal display device 7 was produced using the same method except for the fact that the laminated body 2 was used instead of the laminated body 1 in the production of the liquid crystal display device 6.

Production of a Liquid Crystal Display Device 8

A liquid crystal display device 8 was produced using the same method except for the fact that the laminated body 3 was used instead of the laminated body 1 in the production of the liquid crystal display device 6.

Production of a Liquid Crystal Display Device 9

A liquid crystal display device 9 was produced using the same method except for the facts that the laminated body 3 was used instead of the laminated body 1, and furthermore, the same acrylic gluing agent 2 as the gluing agent used for the production of the laminated body 3 was used to attach the polarizer and the laminated body 3 in the production of the liquid crystal display device 6.

Production of a Liquid Crystal Display Device 10

A liquid crystal display device 10 was produced using the same method except for the fact that the patterned phase difference film 1 was used instead of the laminated body 1 in the production of the liquid crystal display device 6.

(Evaluation)

The produced liquid crystal display devices 6 to 10 were measured and evaluated using the same methods as for the liquid crystal display devices 1 to 5.

TABLE 3

| | Configuration of liquid crystal display device | | Front | | |
|---|---|---|---|---|---|
| | Type of laminated body | Gluing agent used for attachment between "polarizer" and "laminated body" | Environment conditions | surface crosstalk | 3D display variation |
| Liquid crystal display device 6 | Laminated body 1 | Acrylic gluing agent 1 used to produce laminated body 1 | 25° C. 55% | 0.9% | ○ |
| | | | 25° C. 10% | 1.4% | Δ |
| | | | 25° C. 90% | 1.4% | Δ |
| Liquid crystal display device 7 | Laminated body 2 | Acrylic gluing agent 1 used to produce laminated body 1 | 25° C. 55% | 0.9% | ○ |
| | | | 25° C. 10% | 0.9% | ○ |
| | | | 25° C. 90% | 0.9% | ○ |
| Liquid crystal display device 8 | Laminated body 3 | Acrylic gluing agent 1 used to produce laminated body 1 | 25° C. 55% | 0.9% | ○ |
| | | | 25° C. 10% | 1.2% | ○ |
| | | | 25° C. 90% | 1.2% | ○ |
| Liquid crystal display device 9 | Laminated body 4 | Acrylic gluing agent 2 used to produce laminated body 3 | 25° C. 55% | 0.9% | ○ |
| | | | 25° C. 10% | 1.4% | Δ |
| | | | 25° C. 90% | 1.3% | Δ |
| Liquid crystal display device 10 | (product form) | Acrylic gluing agent 1 used to produce laminated body 1 | 25° C. 55% | 0.9% | ○ |
| | | | 25° C. 10% | 28% | X |
| | | | 25° C. 90% | 17% | X |

From Table 3, it is found that, in the liquid crystal display devices 6 to 9 in which the laminated body including the patterned phase difference film and the stiff body is used, the influence of durability performance against a low humidity and a high humidity, that is, the extension and contraction of the supporter film, the polarizer and the like is reduced compared with the liquid crystal display device 10 in which the laminated body is not used. In addition, it is found that, when the laminated body having an average dimensional change rate per 1% RH of humidity at a temperature of 25° C. and a humidity in a range of 10% RH to 90% RH of 0.0015% or less in a pattern cycle direction of the patterned optical anisotropic layer is used, the durability performance against a low humidity and a high humidity is excellent.

In addition, it is found that, while the liquid crystal display devices 8 and 9 have the same configuration except for the fact that the second attaching layers attaching the image-displaying side polarization plate and the laminated body are different, the liquid crystal display device 8 has superior durability performance against a low humidity and a high humidity. Based on the above-described result, it is found that, when the gluing force between the patterned optical anisotropic layer and the glass plate is stronger than the gluing force between the image-displaying side polarization plate and the laminated body, the durability performance against a low humidity and a high humidity is excellent.

What is claimed is:

1. A polarization plate comprising:
   a polarizer; and
   a laminated body comprising:
   a patterned phase difference film having a supporter film and a patterned optical anisotropic layer in which a first phase difference region and a second phase difference region having mutually different in-plane slow axis directions and/or phase differences are disposed in a predetermined pattern on the supporter film; and
   a stiff body attached to a surface of the patterned optical anisotropic layer through a first attaching layer,
   wherein the laminated body and the polarizer are attached together through a second attaching layer,
   wherein the polarizer and the stiff body are attached together through the second attaching layer,
   wherein an adhering force of the second attaching layer is smaller than an adhering force of the first attaching layer, and
   wherein the polarization plate is provided with the supporter film, an orientation film, the patterned optical anisotropic layer, the first attaching layer, the stiff body, the second attaching layer, and the polarizer in this order.

2. The polarization plate according to claim 1, wherein a thickness of the stiff body is in a range of 20 μm to 250 μm.

3. The polarization plate according to claim 2, wherein the stiff body is glass.

4. The polarization plate according to claim 3, wherein an average dimensional change rate per 1% RH of humidity at a temperature of 25° C. and a relative humidity in a range of 10% RH to 90% RH is 0.0015% or less in a pattern cycle direction of the patterned optical anisotropic layer.

5. The polarization plate according to claim 3, wherein a supporter film is provided on at least one surface of the stiff body.

6. The polarization plate according to claim 2, wherein an average dimensional change rate per 1% RH of humidity at a temperature of 25° C. and a relative humidity in a range of 10% RH to 90% RH is 0.0015% or less in a pattern cycle direction of the patterned optical anisotropic layer.

7. The polarization plate according to claim 2, wherein a supporter film is provided on at least one surface of the stiff body.

8. The polarization plate according to claim 1, wherein the stiff body is glass.

9. The polarization plate according to claim 8,
wherein an average dimensional change rate per 1% RH of humidity at a temperature of 25° C. and a relative humidity in a range of 10% RH to 90% RH is 0.0015% or less in a pattern cycle direction of the patterned optical anisotropic layer.

10. The polarization plate according to claim 8,
wherein a supporter film is provided on at least one surface of the stiff body.

11. The polarization plate according to claim 1,
wherein an average dimensional change rate per 1% RH of humidity at a temperature of 25° C. and a relative humidity in a range of 10% RH to 90% RH is 0.0015% or less in a pattern cycle direction of the patterned optical anisotropic layer.

12. The polarization plate according to claim 1,
wherein a supporter film is provided on at least one surface of the stiff body.

13. The polarization plate according to claim 1,
wherein a protective film is further provided, and the protective film and the stiff body are attached together through the second attaching layer.

14. The polarization plate according to claim 1,
wherein an adhering force of the second attaching layer is smaller than an adhering force of the first attaching layer.

15. The polarization plate according to claim 1,
wherein the first attaching layer and the second attaching layer are either acrylic adhesives or epoxy-based adhesives.

16. A stereoscopic image display device comprising at least:
a display panel driven based on an image signal; and
the polarization plate according to claim 1 disposed on an image-displaying side of the display panel.

17. A stereoscopic image display system comprising at least:
the stereoscopic image display device according to claim 16; and
the polarization plate disposed on an image-displaying side of the stereoscopic image display device,
wherein a stereoscopic image is displayed through the polarization plate.

* * * * *